United States Patent
Karami et al.

(10) Patent No.: US 11,376,560 B2
(45) Date of Patent: Jul. 5, 2022

(54) HIGHLY ACTIVE SORBENTS AND OXYGEN CARRIERS SUPPORTED BY CALCINED ALUMINA AEROGEL FOR LOW-TEMPERATURE CARBON CAPTURE AND CHEMICAL-LOOPING COMBUSTION OF METHANE

(71) Applicant: UTI Limited Partnership, Calgary (CA)

(72) Inventors: Davood Karami, Calgary (CA); S. Toufigh Bararpour, Calgary (CA); Nader Mahinpey, Calgary (CA)

(73) Assignee: UTI Limited Partnership, Calgary (CA)

( * ) Notice: Subject to any disclaimer, the term of this patent is extended or adjusted under 35 U.S.C. 154(b) by 518 days.

(21) Appl. No.: 16/419,851

(22) Filed: May 22, 2019

(65) Prior Publication Data

US 2019/0358606 A1    Nov. 28, 2019

Related U.S. Application Data

(60) Provisional application No. 62/675,505, filed on May 23, 2018.

(51) Int. Cl.
*B01J 20/08* (2006.01)
*C01F 7/021* (2022.01)
(Continued)

(52) U.S. Cl.
CPC .............. *B01J 20/08* (2013.01); *B01D 53/04* (2013.01); *B01J 20/043* (2013.01); *B01J 20/06* (2013.01);
(Continued)

(58) Field of Classification Search
CPC . B01J 20/08; B01J 20/043; B01J 20/06; B01J 20/28047; B01J 20/28066;
(Continued)

(56) References Cited

U.S. PATENT DOCUMENTS

| 3,963,646 A | 6/1976 | Teichner et al. |
| 4,469,816 A | 9/1984 | Armor et al. |

(Continued)

FOREIGN PATENT DOCUMENTS

| WO | WO-2009062518 A1 * | 5/2009 | .......... B01J 13/0091 |
| WO | WO 2009/144472 | 12/2009 | |

OTHER PUBLICATIONS

Bedilo et al., "Nanocrystalline Aerogels of Metal Oxides as Destructive Sorbents and Catalysts" Chemistry for Sustainable Development, 19:25-32 (2011).

(Continued)

*Primary Examiner* — James A Fiorito
(74) *Attorney, Agent, or Firm* — Michael Blessent; Karl Bozicevic; Bozicevic, Field & Francis LLP

(57) ABSTRACT

The invention provides highly reactive nano-sized alumina particle compositions, including alumina compositions with a BET surface areas on the order of 2000 $m^2/g$. Also disclosed are impregnated alumina supports comprising materials that are metal oxides or carbonates. Methods for the synthesis and fabrication of these compositions are provided, along methods for the use of these compositions as sorbents.

21 Claims, 7 Drawing Sheets

(51) Int. Cl.
  *B01J 20/32*    (2006.01)
  *B01J 20/06*    (2006.01)
  *B01J 20/04*    (2006.01)
  *B01J 20/28*    (2006.01)
  *B01D 53/04*    (2006.01)
  *F23C 13/08*    (2006.01)
  *C01F 7/448*    (2022.01)

(52) U.S. Cl.
  CPC ... *B01J 20/28047* (2013.01); *B01J 20/28066* (2013.01); *B01J 20/3204* (2013.01); *B01J 20/3234* (2013.01); *C01F 7/021* (2013.01); *C01F 7/448* (2013.01); *F23C 13/08* (2013.01); *B01D 2253/306* (2013.01); *B01D 2257/504* (2013.01); *C01P 2002/72* (2013.01); *C01P 2002/88* (2013.01); *C01P 2004/03* (2013.01); *C01P 2004/52* (2013.01); *C01P 2006/12* (2013.01)

(58) Field of Classification Search
  CPC .... B01J 20/3204; B01J 20/3234; C01F 7/021; C01F 7/448; F23C 13/08
  See application file for complete search history.

(56) References Cited

U.S. PATENT DOCUMENTS

| | | |
|---|---|---|
| 4,550,093 A | 10/1985 | Fanelli et al. |
| 4,717,708 A | 1/1988 | Cheng et al. |
| 6,087,294 A | 7/2000 | Klabunde et al. |
| 6,271,170 B1 | 8/2001 | Suh et al. |
| 6,740,141 B2 | 5/2004 | Espin et al. |
| 6,770,584 B2 | 8/2004 | Barney et al. |
| 2003/0180213 A1 | 9/2003 | Carnes et al. |
| 2010/0139486 A1 | 6/2010 | Smirniotis et al. |
| 2010/0311577 A1 | 12/2010 | Li et al. |
| 2013/0247757 A1 | 9/2013 | Lee et al. |

OTHER PUBLICATIONS

Teichner et al. "Inorganic Oxide Aerogels" Advances in Colloid Interface Science, 5:245-273 (1976).

* cited by examiner

HIGHLY ACTIVE SORBENTS AND OXYGEN CARRIERS SUPPORTED BY CALCINED ALUMINA AEROGEL FOR LOW-TEMPERATURE CARBON CAPTURE AND CHEMICAL-LOOPING COMBUSTION OF METHANE

FIELD

The invention is in the field of chemical and physical processes for the production and use of metal oxide and hydroxide sorbents, including alumina aerogels.

BACKGROUND

Alternative methods have been described for the preparation and use of various metal oxide aerogels, such as silica, alumina ($Al_2O_3$) and magnesia aerogels (see Teichner et al., Inorganic oxide aerogels, *Advances in Colloid and Interface Science* (1976), 5(3), 245-73; U.S. Pat. Nos. 4,550,093; 4,717,708). These materials generally have very high surface areas and are often excellent sorbents for a range of substances. In general, metal oxide aerogels show much more reactivity than the corresponding metal oxides. These materials may be prepared as a single metal oxide, or as composites (see U.S. Pat. Nos. 3,963,646, 4,469,816, and 6,770,584).

SUMMARY

Highly reactive nano-sized alumina particle compositions are provided, including compositions comprising materials that are oxides or carbonates of the elements of groups IA or the transition metals. The materials may be intimately mixed on a nano-sized scale. Select compositions showed very small average particle sizes and consistently large surface areas. Methods for the synthesis and fabrication of these compositions are provided, along methods for the use of these compositions as sorbents. In select embodiments, nano-sized particle alumina supports with a BET surface area on the order of 2000 $m^2/g$ are disclosed.

A selected method for preparing alumina hydroxide and oxide compositions is depicted as follows:

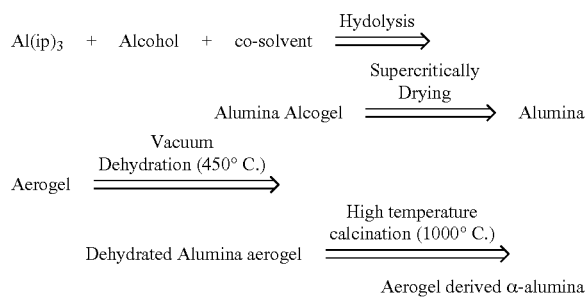

In select embodiments, solid compositions may be prepared by mixing solid oxides and/or carbonates on alumina supports with large surface areas. These compositions exhibited excellent performance in low-temperature carbon capture and chemical-looping combustion processes. These compositions may for example include materials selected from the oxides and/or carbonates of elements of Groups IA, IIIA, and the transition metals. The compositions used as supports were synthesized by preparing aluminum alkoxide solutions, which were then hydrolyzed to obtain an alcogel. The alcogel was first supercritically dried and then calcined at high temperature to yield aluminum hydroxide or aluminum oxide. The exemplified alumina aerogel compositions comprised a uniform dispersion of nano-sized particles of alumina, characterized as substantially fluffy clusters of particles, having a BET surface areas in the range of 700 to 2000 $m^2/g$, a pore volume in the range of 1.5 to 6.5 $cm^3/g$, and a bulk density in the range of 0.01 to 0.05 $g/cm^3$.

Calcined alumina supports were impregnated with a metal carbonate and metal oxides to exemplify alternative solid compositions. These compositions were used, respectively, as sorbents for carbon dioxide capture from flue gases at low temperature and as oxygen carriers for methane chemical looping combustion at high temperature. The prepared sorbent of alumina-aerogel-supported $K_2CO_3$ exhibited an almost 100% $CO_2$-capture efficiency. The oxygen capacity (OC) of the supported metal oxide oxygen carriers was shown to be near the theoretical OC of metal oxides during multi-cycle operations.

DETAILED DESCRIPTION

Figure 1:
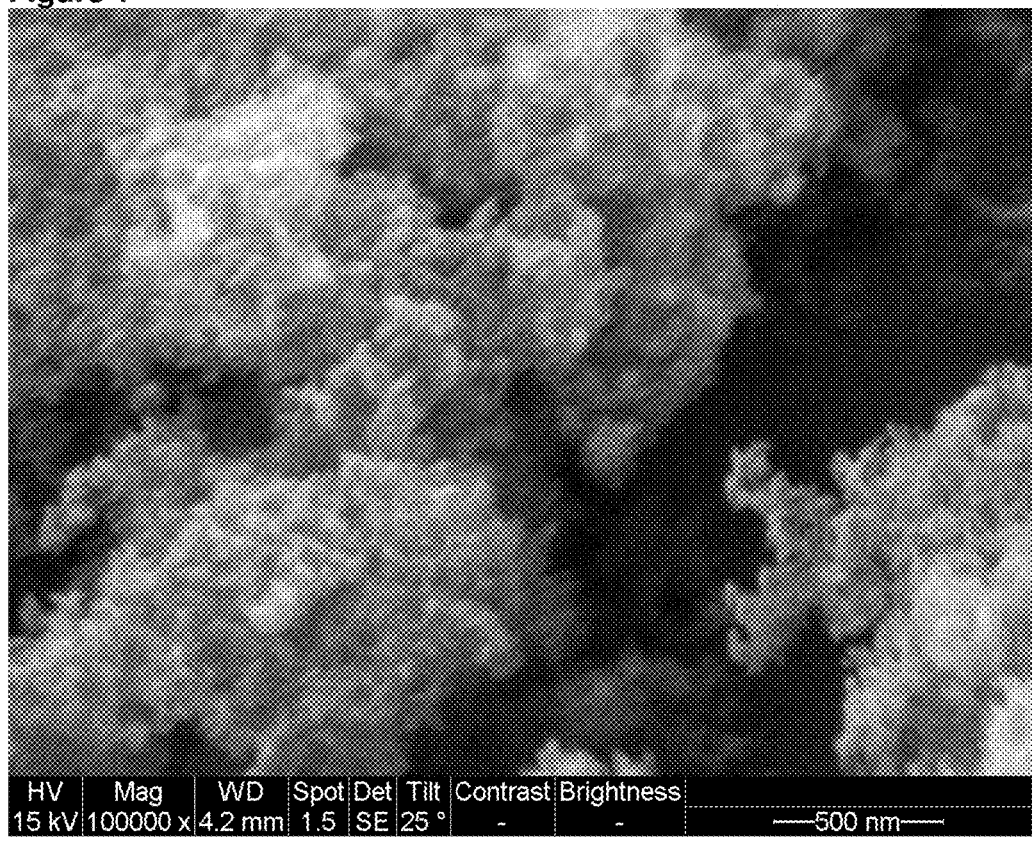
FIG. 1 is a scanning electron micrograph (SEM) image of an aerogel produced in accordance with an exemplified embodiment of the invention (Sample A1).

Methods are provided for preparing a series of aluminum compounds, including nano-scale oxide and hydroxide particulates with very high surface areas. In an initial step, aluminum alkoxide solutions are prepared in a suitable solvent. Aluminum alkoxides may for example be of the formula of $(RO)_3Al$, where each R is a C1-C6 straight or branched chain alkyl group. Exemplary alkoxides comprise isopropyl and sec-butyl groups.

The aluminum alkoxide solution is then hydrolyzed to yield an alumina alcogel. Thereafter, the alcogel is dried under supercritical conditions, at a temperature over the supercritical point of the solvent, to yield an alumina aerogel. Supercritical drying may for example be carried out for a period of from 1.5-3.5 hours.

The alumina aerogel may in turn be subject to thermal dehydration, to provide a dehydrated alumina aerogel comprising aluminum hydroxide. The thermal dehydration may for example be carried out at a temperature of 300-500° C., for example for a period of 1-3 hours.

The foregoing dried or dehydrated aerogel compositions may for example be used as adsorbents, for example for physical adsorption of gases.

The dehydrated aerogel may be calcined to provide particulate aluminum oxide compositions. The calcination may for example be performed at a temperature of 800-1200° C., for example for a period of 2-5 hours. The nano-sized aluminum oxide prepared in this way has an extraordinarily high BET surface area, in some embodiments of at least 750 $m^2/g$.

Compositions provided by the foregoing methods may for example be used as solid supports, for example for the removal of target materials through physisorption or chemisorption. Exemplified processes of this kind involve contacting the selected compositions with target materials such as $CO_2$ and $SO_2$ (exemplary of flue gases containing $CO_2$). The following examples also illustrate that aerogel-derived compositions with high surface areas calcined at high temperatures provide sufficient surface and stability to provide solid supports for metal oxides as part of the methane chemical-looping process.

The following Examples describe select compositions and methods, illustrating only select aspects of the present innovation. Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

Example 1: Preparation and Characterization of Alumina Aerogel Compositions

In this example, alumina aerogel nano-sized powder was synthesized and stored. The synthesis consisted of four main steps, and was followed by characterization of the materials:

1. Synthesis of Alumina Alcogel

This step comprises the hydrolysis of an aluminum alkoxide solution ($Al(RO)_3$+Alcohol+Co-solvent). The chemicals used in the synthesis were directly obtained from a commercial source without further purification. Aluminum tri-isopropoxide (Aldrich) was added to a 100 ml beaker. The $Al((CH_3)_2CHO)_3$ was dissolved in a solution of 20-100 ml toluene co-solvent (Aldrich) and 10-30 ml methanol (Aldrich) to form a clear colorless solution. A specific amount of DI water (2-5 moles of $H_2O$ per mole of $Al((CH_3)_2CHO)_3$) was then added drop-wise to the solution to form the aluminum hydroxide alcogel. The reaction mixture was then stirred at room temperature for 1-14 days for ageing. During this time, the mixture remained a clear colorless gel, but was dilute enough to maintain a liquid state.

2. Supercritical Drying of the Solvents

The hydroxide alcogel was transferred to a 100 ml glass liner of a Parr high-pressure batch reactor. The reactor was first flushed with nitrogen and then pressurized to 100-300 Psi with nitrogen. The reactor was slowly heated without stirring from room temperature to 250-270° C. for a period of 1-3 hours. As the reactor was heating, the pressure was increased from 100-300 Psi to 600-1200 Psi. After the reactor reached the target temperature, it was kept at that temperature for a while and then flashed to the atmosphere quickly to remove the solvent vapors. Afterward, the heating jacket was removed and the reactor was flushed with nitrogen for 5 minutes to remove the remaining solvent vapors. The reactor was then allowed to cool down to the room temperature.

3. Thermal Dehydration of Aluminum Hydroxide

Data from thermogravimetric analysis (TGA) confirmed that aluminum hydroxide lost the highest weight at a temperature of 400-450° C. to convert to dehydrated alumina. The fluffy, white aluminum hydroxide powder was placed into a BET tube connected to a degassing vacuum line of the BET instrument. The tube was evacuated at room temperature for a while to 10 μHg vacuum. Afterward, the tube was slowly heated from room temperature to 450° C. at a ramp of 10° C./min under dynamic vacuum. After the heat treatment was complete, the degassing line was turned off and the tube cooled down to the room temperature under dynamic vacuum. After this step, the dehydrated alumina had a light gray color.

4. Calcination

Figure 4:
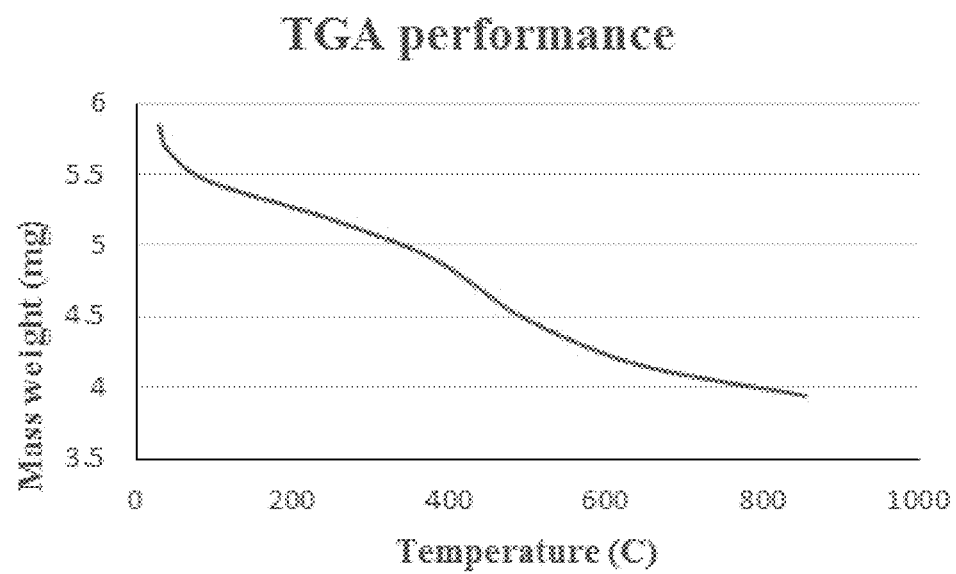
FIG. 4 is a graph showing thermogravimetric analysis (TGA) performance of Sample A1 (thermal dehydration).

The fresh and heat-treated samples were calcined to the temperature up to 1200° C. to obtain aerogel-derived δ or α-alumina, which exhibited a higher surface area than that of the commercial α-alumina. Specifically, alumina aerogel was calcined in a muffle furnace without gas flow and at high temperatures. In an exemplary procedure, first, sample A4 was subjected to a dynamic vacuum using the BET instrument degassing port at 450° C. The BET surface area increased from 1112 to 1331 $m^2/g$ as shown in Table 2. Generally, during low temperature dehydration, the surface areas remained constant, as for instance in sample A9. The significant decrease in surface areas at temperatures above 500° C. can be explained by sintering. By calcination of A4 after vacuum dehydration at 1000° C., its surface area reduced to 352 $m^2/g$. The additional five samples calcined at 1000° C. showed different surface areas. The highest surface area belonged to sample A2, changing from 1427 to 420 $m^2/g$ as shown in Table 2. Two samples of A2 and A6 calcined at the higher temperature of 1200° C. (close to α-alumina formation temperature) showed low surface areas of less than 100 $m^2/g$. TGA thermal treatment of alumina aerogel under nitrogen flow of 30 ml/min (FIG. 4) demonstrated that half of the sample weight loss occurred slowly up to temperature of around 400° C. (17%), and the remaining occurred up to around 850° C. (32.4% total mass loss) with the same rate.

5. Characterization

For X-Ray Diffraction (XRD) studies, powder samples were placed on a sample holder after the heat treatment under vacuum or after immediate removal from the reactor and calcination furnace. The instrument used was a Siemens D500 diffractometer, using CuKα radiation (λ=1.5406 Å) with a 2θ range of 10-80°. CuKα radiation was the light source used with the applied voltage of 40 KV and current of 40 mA. The 2θ angles ranged from 10° to 80° with a speed of 2° per minute. Spectra were recorded with a 0.02° step and a 0.08 s step count. The peaks in the XRD patterns were identified using the Jade 7 XRD MDI library.

The morphologies of the fresh and used samples were examined with SEM. Samples were coated with a thin film of gold and platinum (Au-Pt), and micrographs were obtained using a JEOL model 7001F field-emission gun.

The Brunauer-Emmett-Teller (BET) surface areas and pore size distributions were measured using nitrogen adsorption and desorption isotherms at −196° C. on a Micromeritics 2020 volumetric adsorption analyzer, using pressure values ranging from 1 to 760 mmHg. The samples were degassed at 150-450° C. for at least 2-5 hours. The pore size distribution was calculated using the Barrett-Joyner-Halenda (BJH) pore size and volume analysis method.

Thermogravimetric Analysis (TGA) was used to determine the conversion of $Al(OH)_2$ to $Al_2O_3$ during heat treatment. These studies were conducted under a nitrogen flow. To measure weight loss, the samples were placed in a crucible and heated at a rate of 5°/min from room temperature to 850° C. The instrument used was a thermogravimetric analyzer, the TGA-STA-6000 from the PerkinElmer Company.

The Malvern zetasizer (Nano-series, Nano-ZS) dynamic light scattering (DLS) instrument was used to measure the size of alumina aerogel particles. This instrument uses a 633 nm wavelength laser through which the sample particles scattered light in all directions, including towards a detector. The change in the movement of the particle and a correlation function were used in the software (version 7.12) to draw size distribution graphs.

In accordance with the foregoing methods, several embodiments were prepared using various starting materials, solvents, and co-solvents, and by varying the concentration of the solutions, time of ageing and duration of supercritical drying. All of these parameters influence the surface area of the resulting samples. Results are shown in Table 1.

Samples A1 and A3, in which aluminum tri-isopropoxide was used as the starting material, exhibited the highest surface areas. In order to obtain samples with the highest surface areas, sufficient ageing time (around 5 days) is required to be provided for the solutions. Too much ageing time (over 7 days) as for sample A4 and too little ageing time (below one day) as for sample A11 resulted in lower surface areas. The ratios of alcoholic solvent (e.g. methanol) to aromatic co-solvent (e.g. toluene) were also varied and found to have an effect on the surface area. For samples A1 and A3, this ratio (Methanol/Toluene, v/v) was 1/5. It was found that increasing the ratio resulted in a significant decrease in the surface area, changing from 2000 to 743 $m^2/g$ as for samples A8 and A9. Both samples had a Methanol/Toluene ratio of more than 1/2, but the ageing times were 2 days for A8 and 5 days for A9. The amount of aluminum alkoxide used ranged from 0.25 to 1 g and solution mixture concentration varied between 5 and 20 g alkoxide/L, corresponding to 1-5 g alumina/L. The lowest concentrations resulted in the highest surface areas as for samples A1 and A3.

Figure 2:
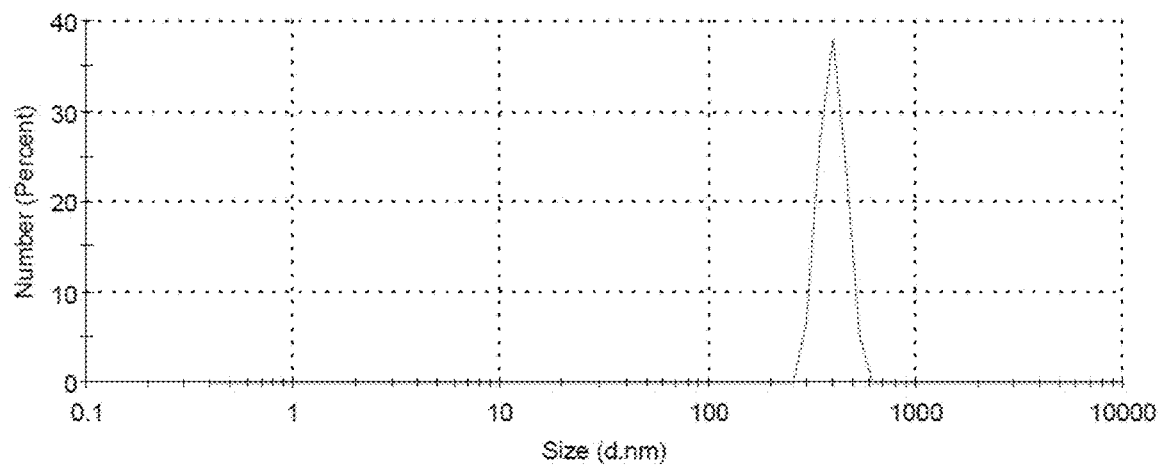
FIG. 2 is a graph showing the particle size distribution of Sample A1 (average size, 397 nm).
Figure 3:
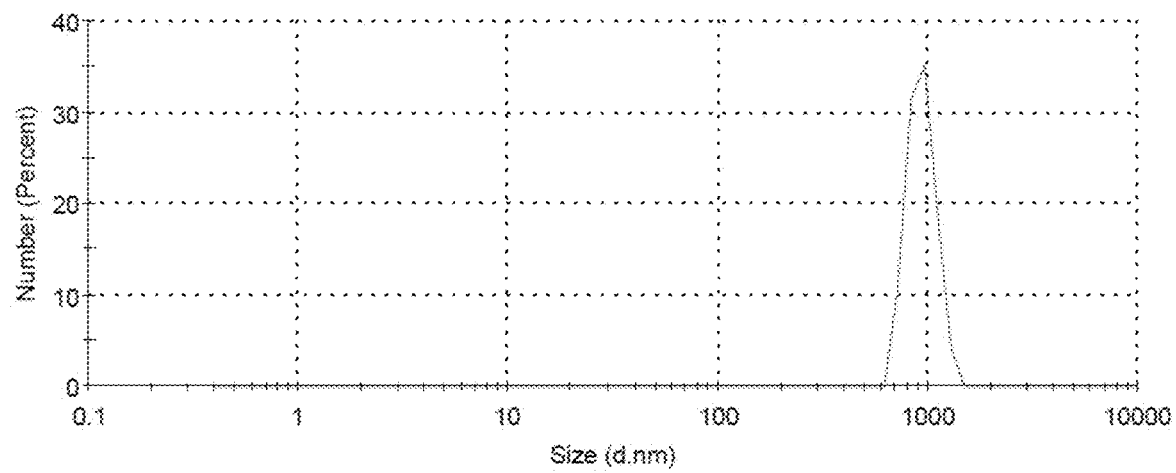
FIG. 3 is a graph showing the particle size distribution of calcined Sample A1 (average size, 929.7 nm).

The solution concentration plays a significant role in increasing the surface area and solubility of the aluminum alkoxide. The solubility of aluminum alkoxide in the mixture solution was much faster than in the individual alcohol solution. Using different alcohols resulted in lower surface areas. Samples A5-A7 and A10-A13 were synthesized under the same condition of sample A3 except for using other types of alcohols (ethanol for samples A5, A6 and A7, propanol for samples A10 and A11 and butanol for samples A12 and A13. The main differences of the samples prepared by the same alcohols were the ageing time and the alcohol/toluene ratio). It was found that changing the solvent resulted in reducing the surface area by half. The other important factor that affected the performance of the samples was storage time. A long storage time resulted in the degradation of the fresh sample due to the very reactive surface triggering the particle growth and strong adsorption of gases. Surface area of sample A1 decreased from 1956 to 1427 $m^2/g$ (sample A2) after one week of storage. Therefore, to avoid the effects of this instability, a fresh sample (obtained immediately after the supercritical drying process) may beneficially be thermally converted to more stable phases. The SEM image of sample A1 in 100 K magnification showed that the sample consisted of very small spherical particles in the shape of disintegrated and loose clusters of a fluffy substance (FIG. 1). Particle sizes of sample A1 was measured by the zetasizer particle analyzer in a range of 200-450 nm. The particles of the calcined alumina aerogel grew to larger values (range of 800-1500 nm) due to sintering (FIGS. 2 and 3).

TABLE 1

Result of BET surface areas of the prepared samples

| Alumina Aerogel | BET ($m^2/g$) | Ads BJH ($m^2/g$) | Des BJH ($m^2/g$) | Pore Volume ($cm^3/g$) | Pore Wide (nm) |
|---|---|---|---|---|---|
| A1 | 1956 | 2479 | 2783 | 5.6 | 8-9 |
| A2 | 1427 | 1827 | 2030 | 4.15 | 8.2-9 |
| A3 | 2019 | 2652 | 3045 | 6.3 | 8.3-9.5 |
| A4 | 1112 | 1381 | 1491 | 2.72 | 7.3-7.9 |
| A5 | 1073 | 1371 | 1515 | 3.63 | 9.6-10.6 |
| A6 | 1000 | 1297 | 1497 | 5.7 | 15.2-17.6 |
| A7 | 1082 | 1365 | 1457 | 2.65 | 7.3-7.7 |
| A8 | 743 | 828 | 1006 | 6.15 | 24.4-29.6 |
| A9 | 862 | 1057 | 1302 | 1.65 | 5.2-6.4 |
| A10 | 778 | 992 | 1149 | 1.8 | 6.2-7.1 |
| A11 | 860 | 1042 | 1170 | 1.82 | 6.2-6.9 |
| A12 | 720 | 927.7 | 1044 | 3.5 | 13.4-15 |
| A13 | 707 | 918 | 989 | 2.8 | 11.4-12.2 |

Figure 5:
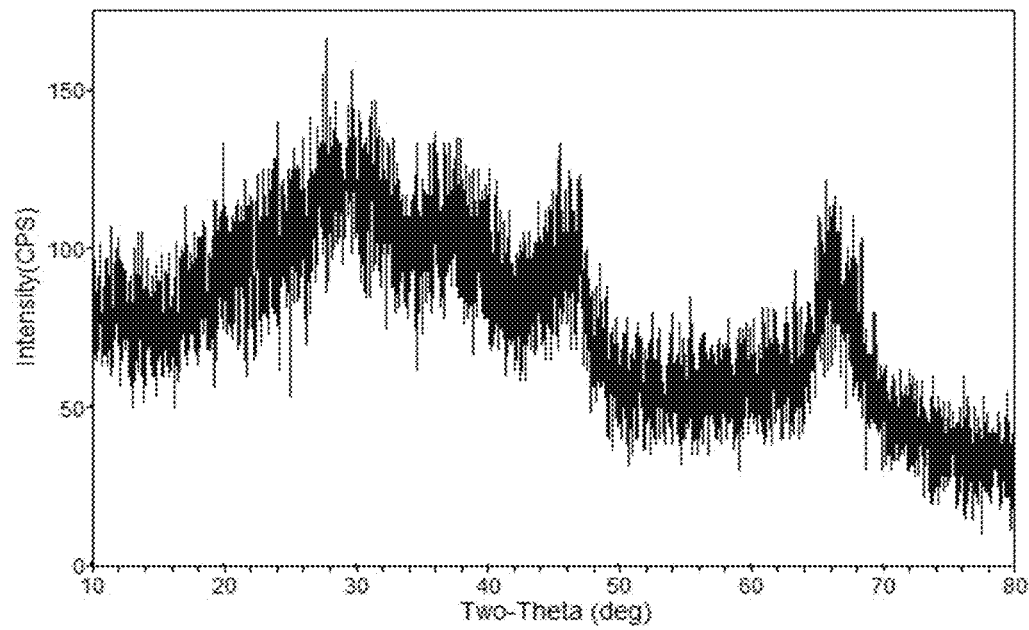
FIG. 5 is a graph showing the X-ray diffraction (XRD) pattern of the prepared alumina aerogel.
Figure 6:
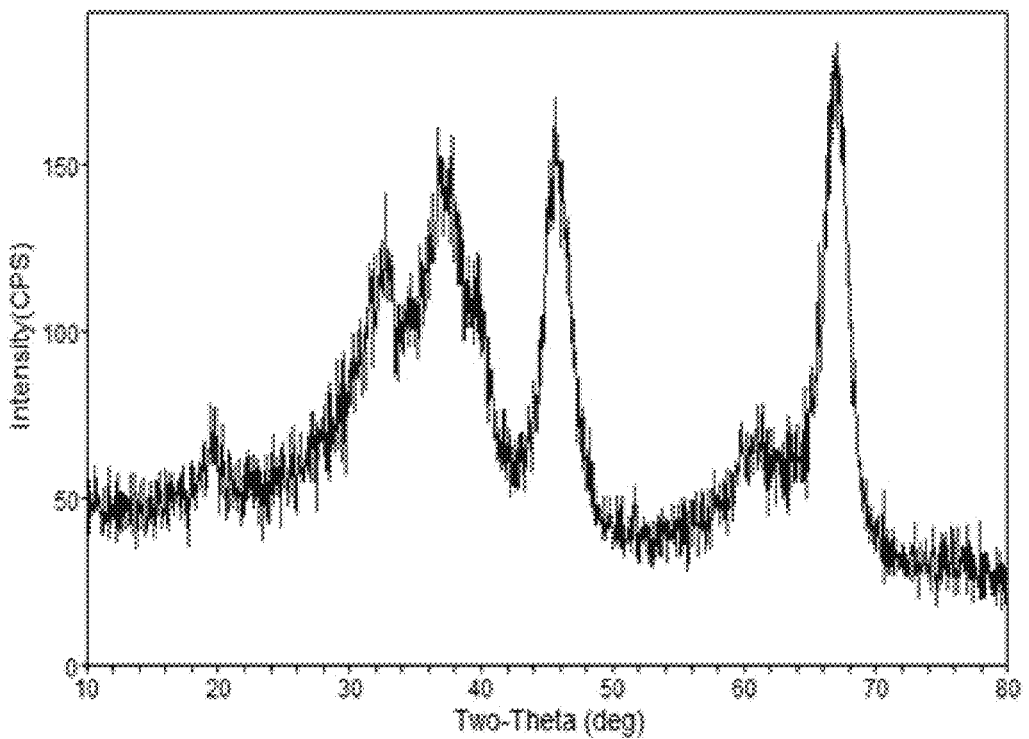
FIG. 6 is a graph showing the XRD pattern of the calcined alumina aerogel.

The XRD patterns showed that the alumina aerogels had an amorphous structure, as shown in FIG. 5. However, the calcined alumina aerogel at 1000° C. exhibited few peaks of δ or α alumina phases, as seen in FIG. 6. Through careful characterization of the alumina samples, it was discovered that the alumina aerogel samples had a different morphology from that of the commercial (CM) alumina samples.

Figure 7:
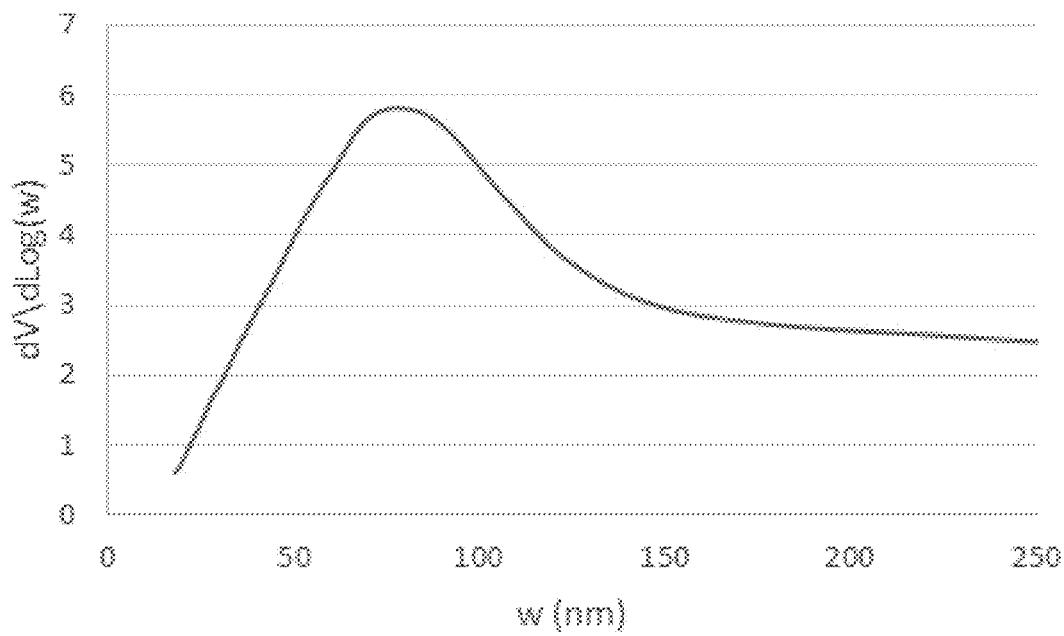
FIG. 7 is a graph showing the Barrett-Joyner-Halenda (BJH) adsorption Pore Size Distribution (PSD) graphs for Sample A1.
Figure 8:
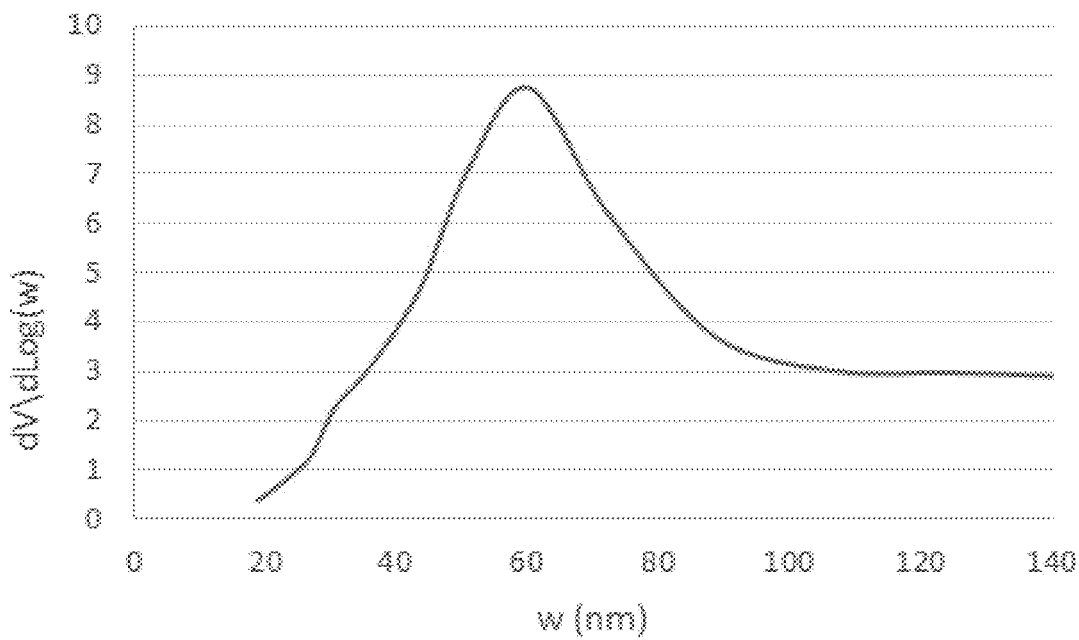
FIG. 8 is a graph showing the BJH desorption Pore Size Distribution (PSD) graphs for Sample A1.

Three types of commercial alumina (Boehmite, γ-alumina and α-alumina) are commonly prepared by the precipitation method and calcined at different temperatures with surface areas within the range of 5-350 $m^2/g$. The typical surface areas of Boehmite, γ-alumina and γ-alumina calcined at 1000° C. (delivered by the Sasol Company) were found to be 350, 145 and 105 $m^2/g$ respectively. The alumina aerogel samples typically possessed surface areas within the range of 700-1300 m²/g after heat treatment at 450° C. When heated at higher temperatures, the crystallites began to sinter and surface areas decreased. Using the BJH method, the pore structure of the alumina aerogel was analyzed. FIGS. 7 and 8 show BJH pore size distributions of sample A1 for the adsorption and desorption branches of the isotherm graph. The broad distributions confirm the nano-sized particles of the aerogel as measured by zetasizer. The alumina aerogel samples with an average surface area of over 1000 m²/g before heat treatment possessed average pore sizes in a range of 7-10 nm in diameter, a volume in a range of 3-6 cc/g, and a cylindrical pore structure that was open at both ends. Table 1 presents surface area, pore volume and wideness of different alumina aerogel samples. After calcination at 1000° C., surface area, pore volume and wideness decreased significantly, as shown in Table 2.

TABLE 2

Result of BET surface areas of the calcined samples

| Alumina Aerogel | BET (m²/g) | Ads. BJH (m²/g) | Des. BJH (m²/g) | Pore Vol. (cm³/g) | Pore wide (nm) |
|---|---|---|---|---|---|
| A4-450 | 1331 | 1609 | 1743 | 3.3 | 7.6-8.2 |
| A4-450-1000 | 353 | 374 | 392 | 1.03 | 10.3-11 |
| A2-1000 | 420 | 227 | 242 | 0.61 | 10-10.7 |
| A2-1200 | 103 | 93.5 | 101 | 0.13 | 5.2-5.9 |
| A3-1000 | 252 | 300 | 299 | 0.62 | 8.17-8.2 |
| A6-1000 | 318 | 342 | 389 | 2.4 | 24.7-28.1 |
| A6-1200 | 79 | 84 | 99.6 | 0.57 | 23-27.2 |
| A9-450 | 854 | 1027 | 1264 | 1.65 | 5.2-6.4 |
| A5-1000 | 120 | 135 | 145 | 0.53 | 15-15.6 |
| A7-1000 | 190 | 507 | 553 | 1.6 | 11.5-12.6 |

Example 2: Low Temperature Carbon Capture

In this Example, the prepared alumina aerogel was used for low-temperature $CO_2$ capture from flue gases. Potassium carbonate, $K_2CO_3$, has been proposed as a suitable sorbent for low-temperature $CO_2$ capture. This sorbent adsorbs $CO_2$ in the presence of $H_2O$ at 60-100° C. by the following reaction to form $KHCO_3$: $K_2CO_3 + CO_2 + H_2O \leftrightarrow 2KHCO_3$ (1).

Figure 9:
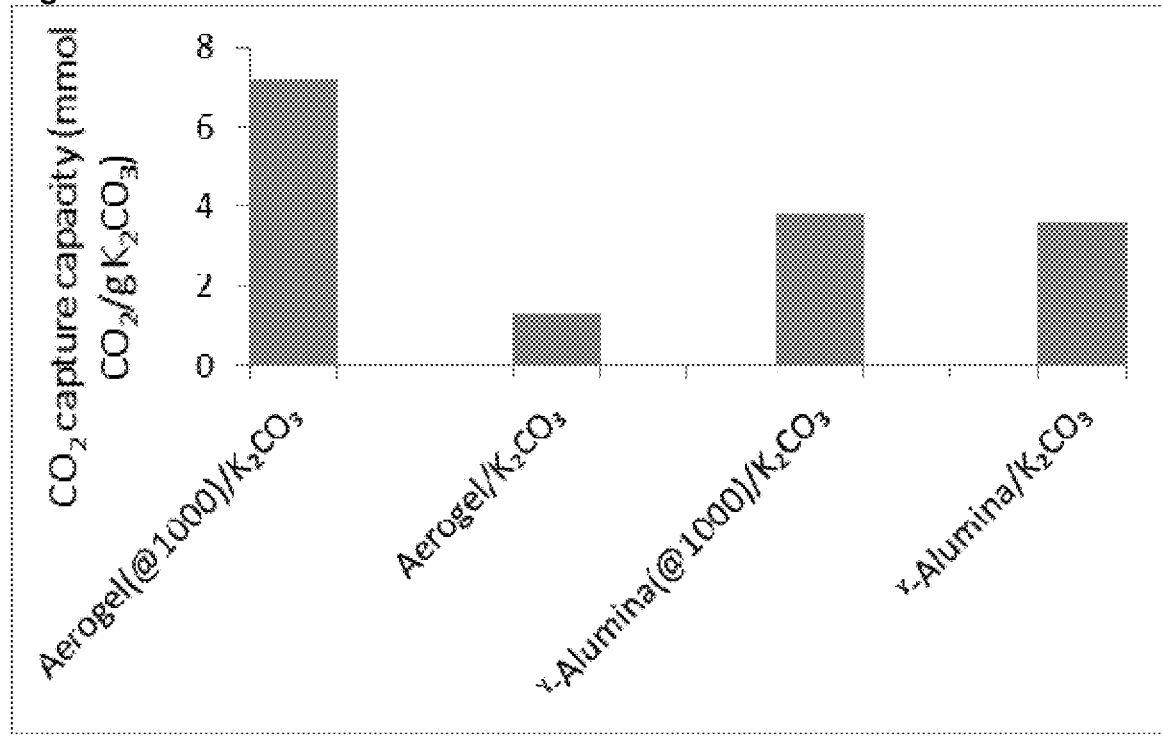
FIG. 9 is a bar graph illustrating $CO_2$ capture capacity of the fabricated sorbents.

Regeneration of $K_2CO_3$ occurs at 120-300° C. with the release of $CO_2$ and $H_2O$. Based on reaction (1), the theoretical amount of $CO_2$ adsorbed per gram of potassium carbonate is calculated at 7.2 mmol. Unsupported $K_2CO_3$ is a deliquescent substance that must be modified to achieve high $CO_2$-capture efficiency for long cyclic operations. $K_2CO_3$ supported by alumina was found to be an efficient sorbent due to the alumina's high surface area, high physical strength and significant resistance to attrition. The $CO_2$-capture efficiency of 50% $K_2CO_3$-supported alumina was illustrated using various types of alumina supports, γ-Alumina, γ-Alumina calcined at 1000° C., alumina aerogel (sample A1), and alumina aerogel calcined at 1000° C. The method of incipient wetness impregnation (IWI) was used for preparing all the sorbents. All sorbents were tested at a carbonation temperature of 50° C. and regeneration temperature of 150° C. The exemplary alumina sorbent showed high reactivity compared to other alumina-supported sorbents tested, at the higher regeneration temperature of 300° C. The sorbent fabricated by calcined sample A1 with a surface area of 420 m²/showed the highest $CO_2$-capture efficiency compared with the other fabricated sorbents at the same conditions (FIG. 9). The sorbent prepared by sample A1 (before calcination) with a surface area of 1000 m²/g showed the lowest $CO_2$-capture efficiency due to having a high hydrophilic characteristic. Higher hydrophilicity of the sorbent resulted in converting the active $K_2CO_3$ precursor to an inactive precursor of $K_2CO_3.1.5H_2O$, which is an inactive by-product that cannot be completely regenerated at the selected regeneration conditions.

Figure 10:
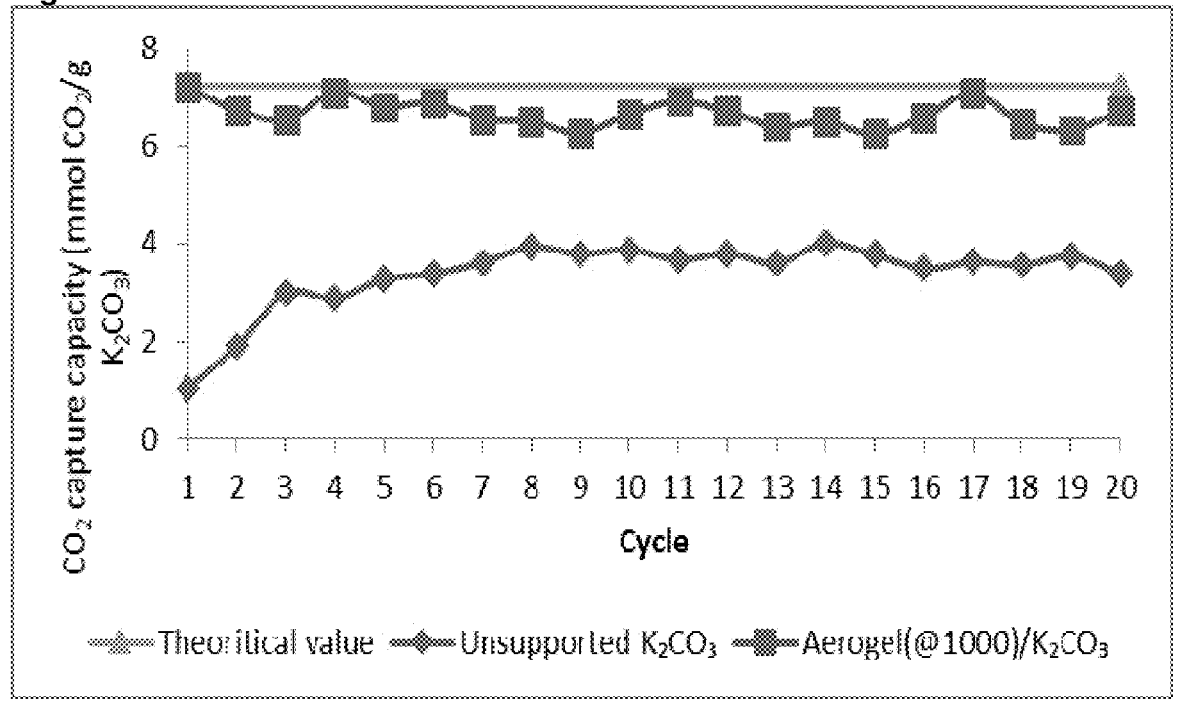
FIG. 10 is a line graph illustrating $CO_2$ capture capacity of the supported and unsupported $K_2CO_3$ sorbents during 20 carbonation/regeneration cycles.
Figure 11:
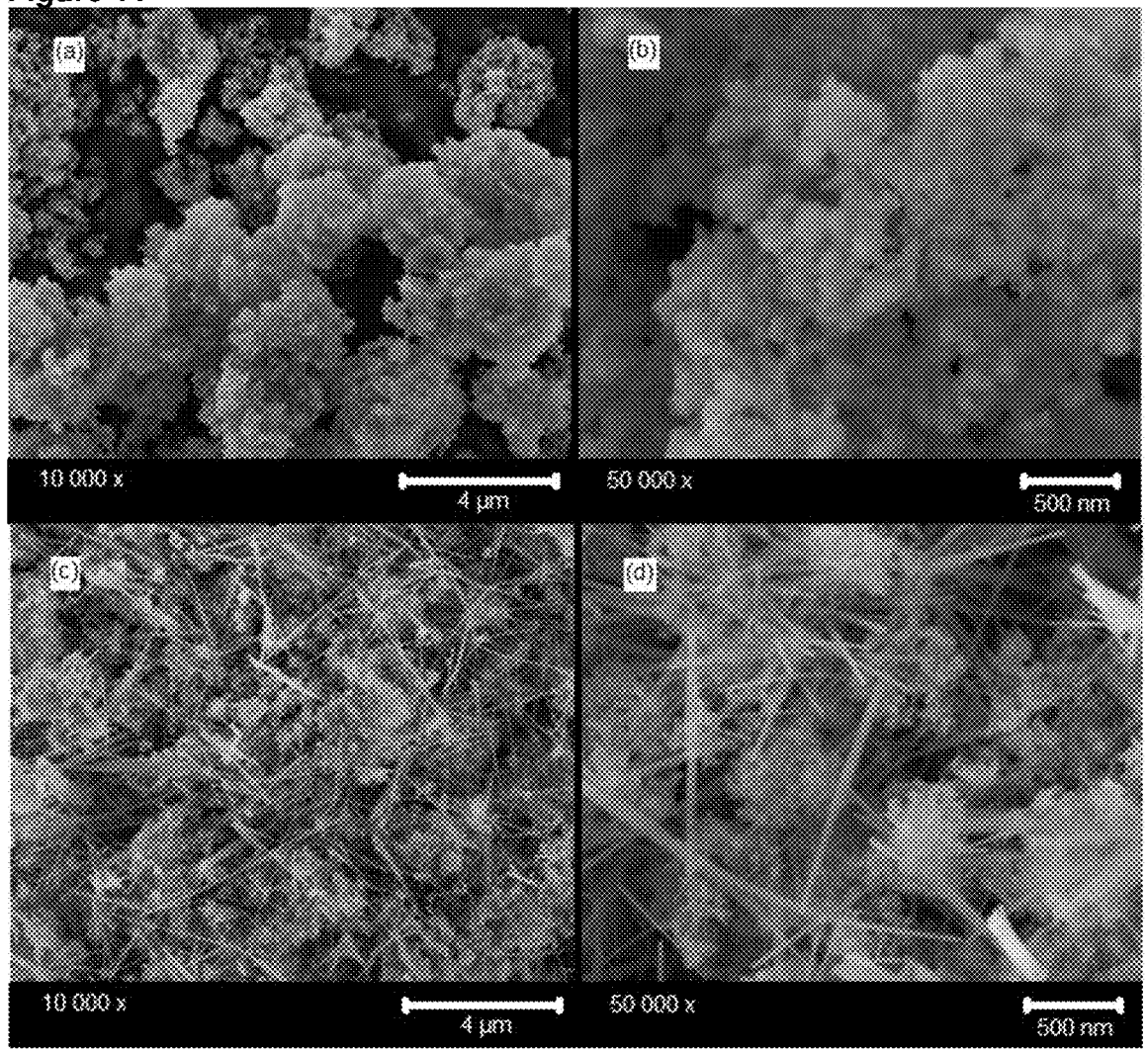
FIG. 11 includes 4 SEM images of (a) & (b) calcined alumina aerogel at 1000° C., and (c) & (d) calcined alumina aerogel supported $K_2CO_3$.

The thermally treated alumina support (calcined sample A1) as a neutral material adsorbed less water than the intact alumina. Moreover, it provided higher surface area to disperse the active component on the surface more effectively. These results explain that the highest $CO_2$-capture efficiency was displayed by the 50% $K_2CO_3$ supported by sample A1 calcined at 1000° C. FIG. 10 shows the cyclic operation of the sorbent. As can be seen in this figure, the sorbent remained stable after 15 carbonation/regeneration cycles. SEM images of the calcined sample A1 and $K_2CO_3$ supported by the calcined sample A1, are shown in FIG. 11 for 10 K and 50 K magnifications. This figure shows the needle-like uniform dispersion of potassium carbonate on the aerogel surface. The fluffy structure shown in these figures belongs to the aerogel support which consists of nanoscale particles as confirmed by BET result (see images at magnification of 50K).

Example 3: Methane Chemical-Looping Combustion

Chemical-looping combustion (CLC) processes produce streams of relatively pure carbon dioxide and condensable steam. Preparation of suitable oxygen carriers is crucial for the long-term operation of a CLC process. Nickel and iron oxides (NiO and $Fe_2O_3$) are promising materials for CLC. However, they exhibit a slow solid-state reaction between active metal oxides and support material at high temperature.

Figure 12:
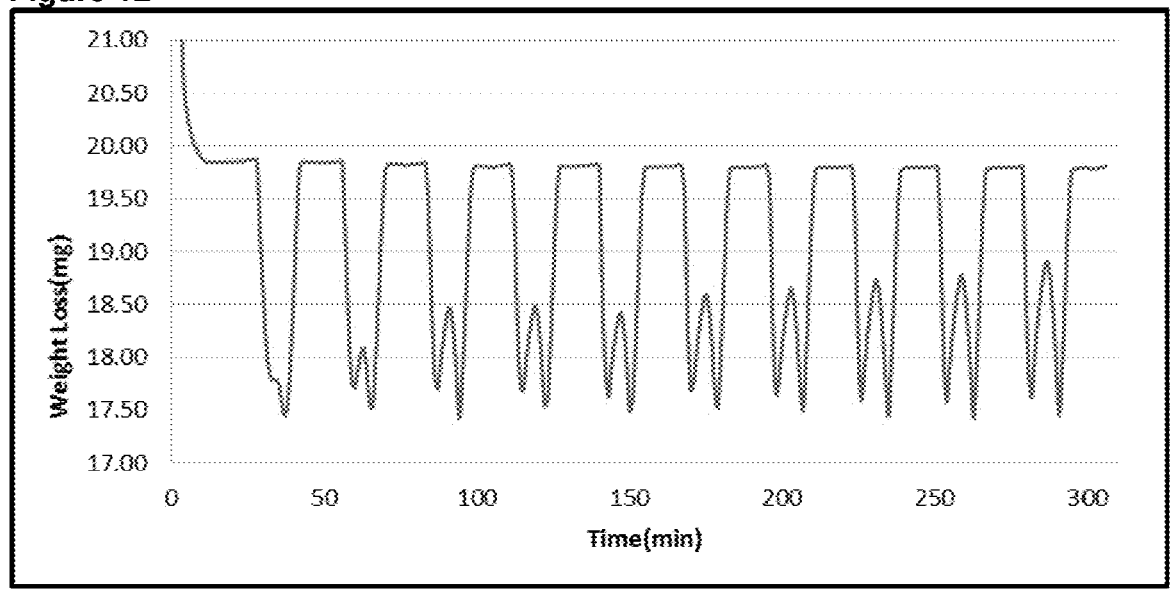
FIG. 12 is a line graph illustrating TGA Performance of 40% NiO/Calcined A1 at 700° C.
Figure 13:
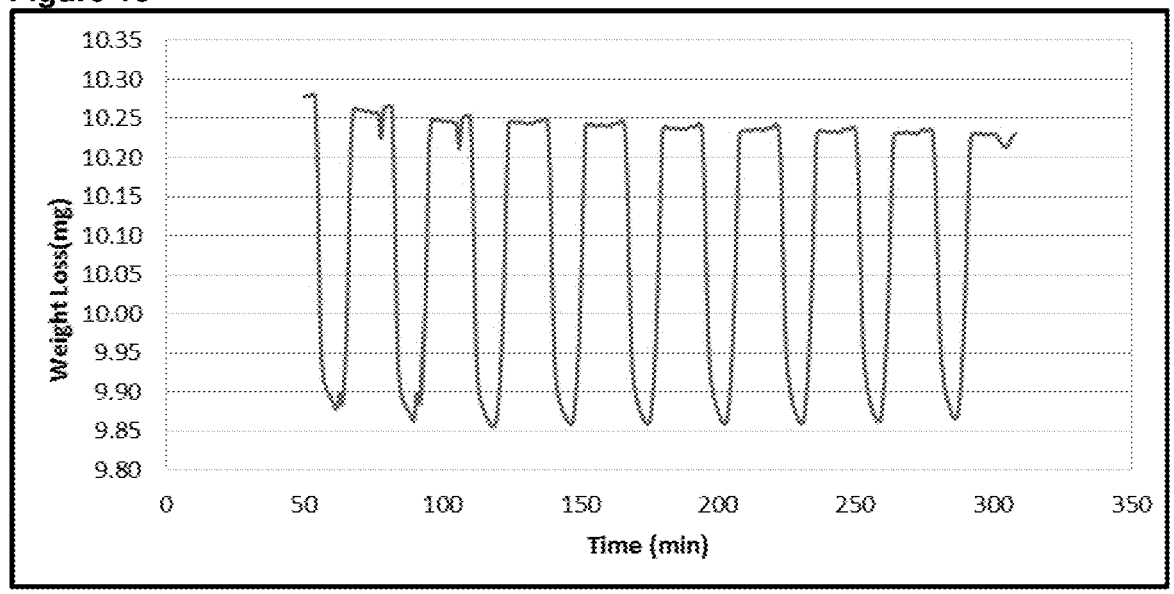
FIG. 13 is a line graph illustrating TGA Performance of 40% $Fe_2O_3$/Calcined A1 at 800° C.

In this Example, highly effective alumina aerogel support calcined at 1000° C. was used to fabricate 40% NiO- and $Fe_2O_3$-supported compositions via the incipient wetness impregnation (IWI) method. The aqueous solution volume was 20% greater than the support pore volume. The loading of NiO and $Fe_2O_3$ was optimized to obtain maximum activity and stability during the cyclic methane CLC operation. Compared with pure metal oxide oxygen carriers, the supported NiO and $Fe_2O_3$ demonstrated a higher reduction-oxidation rate and superior physical stability (FIGS. 12 and 13). X-ray diffraction, thermogravimetric analysis and scanning electron microscopy studies suggest that there was an effective interaction between NiO and $Fe_2O_3$ materials and mesoporous alumina aerogel support, contributing to an excellent performance during the CLC process. When calculated based on the number of grams of pure metal oxide, the oxygen capacity of the supported metal oxides was comparable to that of the pure metal oxides. It was found that the nature of the fuel affected the CLC's activity and stability. NiO was fully reduced to metallic nickel with methane, and $Fe_2O_3$ was reduced to mixed $Fe_3O_4$ and FeO phases.

The invention claimed is:
1. A method of synthesizing an alumina aerogel, comprising:
dissolving an alumina alkoxide in a mixed aromatic and alcoholic solvent to form an alumina alkoxide solution;
adding water to the alumina alkoxide solution, wherein 2-5 moles of $H_2O$ are added per mole of alumina alkoxide, to form a liquid aluminum hydroxide alcogel;

mixing the aluminum hydroxide alcogel for an alcogel aging period to provide an aged alcogel;

supercriticaly drying the aged alcogel, to provide an alumina aerogel having a BET surface area of at least 1500 $m^2/g$.

2. The method of claim 1, wherein the alumina aerogel has a BET surface area of at least 2000 $m^2/g$ following supercritical drying.

3. The method of claim 1, wherein the alumina alkoxide is aluminum tri-isoproxide $Al((CH_3)_2CHO)_3$.

4. The method of claim 1, wherein the alumina alkoxide solution is clear and colorless.

5. The method of claim 1, wherein the liquid aluminum hydroxide alcogel is clear and colorless.

6. The method of any claim 1, wherein the alcogel aging period is more than about 1 day.

7. The method of claim 1, wherein the alcogel aging period is from about 1 to about 7 days.

8. The method of a claim 1, wherein the alcogel aging period is about 5 days.

9. The method of claim 1, wherein the mixed aromatic and alcoholic solvent comprises a mixture of methanol and toluene.

10. The method of claim 9, wherein the v/v ratio of methanol/toluene in the mixed aromatic and alcoholic solvent is less than 1/2 and more than 1/10.

11. The method of claim 9, wherein the v/v ratio of methanol/toluene in the mixed aromatic and alcoholic solvent is about 1/5.

12. The method of claim 1, further comprising thermally dehydrating the alumina aerogel, to provide a dehydrated alumina aerogel.

13. The method of claim 12, wherein the thermal dehydration is carried out at least partially under a dehydrating vacuum pressure.

14. The method of claim 12, wherein the thermal dehydration is carried out at a dehydration temperature of at least 400° C.

15. The method of claim 12, further comprising calcining the dehydrated alumina aerogel, to provide a calcined alumina.

16. The method of claim 15, wherein calcination is carried out at a temperature of at least 1000° C.

17. The method of claim 15, further comprising adsorbing a metal carbonate or oxide on the calcined alumina.

18. The method of claim 17, wherein the metal carbonate is $K_2CO_3$, providing a $K_2CO_3$ impregnated alumina.

19. The method of claim 17, wherein the metal oxide is NiO and/or $Fe_2O_3$, providing a NiO and/or $Fe_2O_3$ impregnated alumina.

20. A method of low-temperature carbon capture comprising exposing the $K_2CO_3$ impregnated alumina of claim 18 to $CO_2$.

21. A method of chemical-looping combustion comprising use of the NiO and/or $Fe_2O_3$ impregnated alumina of claim 19 as an oxygen carrier.

* * * * *

UNITED STATES PATENT AND TRADEMARK OFFICE
CERTIFICATE OF CORRECTION

| | |
|---|---|
| PATENT NO. | : 11,376,560 B2 |
| APPLICATION NO. | : 16/419851 |
| DATED | : July 5, 2022 |
| INVENTOR(S) | : Davood Karami et al. |

It is certified that error appears in the above-identified patent and that said Letters Patent is hereby corrected as shown below:

In the Specification

Line 10 Column 5, the sentence should recite "with a $2\theta$ range of".

Line 57 Column 6, the sentence should recite "$\delta$ or $\alpha$ alumina phases".

Signed and Sealed this
Sixteenth Day of August, 2022

*Katherine Kelly Vidal*
Katherine Kelly Vidal
*Director of the United States Patent and Trademark Office*